United States Patent
Das et al.

(10) Patent No.: US 8,364,709 B1
(45) Date of Patent: Jan. 29, 2013

(54) DETERMINING WORD BOUNDARY LIKELIHOODS IN POTENTIALLY INCOMPLETE TEXT

(75) Inventors: Abhinandan S. Das, Sunnyvale, CA (US); Harry S. Fung, Saratoga, CA (US)

(73) Assignee: Google Inc., Mountain View, CA (US)

( * ) Notice: Subject to any disclaimer, the term of this patent is extended or adjusted under 35 U.S.C. 154(b) by 221 days.

(21) Appl. No.: 12/951,529

(22) Filed: Nov. 22, 2010

(51) Int. Cl.
*G06F 7/00* (2006.01)
(52) U.S. Cl. ........................................ 707/780
(58) Field of Classification Search ............ 707/780
See application file for complete search history.

(56) References Cited

U.S. PATENT DOCUMENTS

| | | | |
|---|---|---|---|
| 7,836,044 B2 | 11/2010 | Kamvar et al. | |
| 7,917,350 B2 * | 3/2011 | Mori et al. | 704/2 |
| 2003/0097252 A1 * | 5/2003 | Mackie | 704/9 |
| 2007/0050352 A1 * | 3/2007 | Kim | 707/4 |
| 2008/0065617 A1 * | 3/2008 | Burke et al. | 707/5 |
| 2009/0043741 A1 | 2/2009 | Kim | |
| 2009/0119289 A1 | 5/2009 | Gibbs et al. | |

* cited by examiner

*Primary Examiner* — Jensen Hu
(74) *Attorney, Agent, or Firm* — Fish & Richardson P.C.

(57) ABSTRACT

Methods, systems, and apparatus, including computer programs encoded on a computer storage medium, for determining word boundary likelihoods in potentially incomplete text. In one aspect, a method includes selecting query sequences from the query, each query sequence being at least a portion of a word n-gram, the word n-gram being a subsequence of up to n words selected from the second sequence of words of the query, and for each query sequence: determining one or more query sequence keys for the query sequence; determining at least one of a word boundary count and a non-word boundary count for each query sequence key, each word-boundary count and non-word boundary count being dependent on the context of the query sequence; and associating, in a data storage device, the at least one word boundary count and non-word boundary counts with each query sequence key.

26 Claims, 6 Drawing Sheets

DETERMINING WORD BOUNDARY LIKELIHOODS IN POTENTIALLY INCOMPLETE TEXT

BACKGROUND

This specification relates to search query processing.

The Internet provides access to a wide variety of resources, for example, video files, image files, audio files, or Web pages, including content for particular subjects, book articles, or news articles. A search system can select one or more resources in response to receiving a search query. A search query is data that a user submits to a search engine to satisfy the user's informational needs. The search queries are usually in the form of text, e.g., one or more query terms. The search system selects and scores resources based on their relevance to the search query and on their importance relative to other resources to provide search results that link to the selected resources. The search results are typically ordered according to the scores and presented according to this order.

Search systems can provide query suggestions to users to help users satisfy their informational needs. As used herein, the term "query suggestion" is suggested data for a query that is used to refine a search query or refine a search strategy. Some search systems provide query suggestions in the form of a list of queries as the user is typing a query. The user can select one of the query suggestions from the list without having to type the entire query suggestion. A client device typically sends suggestion requests to a search engine with each keystroke, and the search engine provides the query suggestions with prefixes that match the entered characters. Once received, the client device displays these suggestions for user selection.

Some search systems also provide search results with query suggestions. The search results that are provided are, for example, search results that are responsive to suggestions that are determined to be the best match for a current query input.

However, for unusual or rare queries, which are referred to as "long-tail" queries, providing accurate query suggestions can be a challenge. Furthermore, as query suggestions for long-tail queries may be nonexistent, search results responsive to the query suggestions cannot be provided. While the search system can immediately provide search results for each of the completed words in the long-tail query that the user in inputting into a search interface, doing so with every keystroke may actually degrade the user experience, as many of the search results for the incomplete long-tail query may not be of interest to the user.

SUMMARY

In general, one innovative aspect of the subject matter described in this specification can be embodied in methods that include the actions of accessing queries stored in query logs, each query being one or more characters in a first sequence constituting one or more words in a second sequence; for each query: selecting query sequences from the query, each query sequence being at least a portion of a word n-gram, the word n-gram being a subsequence of up to n words selected from the second sequence of words of the query, and for each query sequence: determining one or more query sequence keys for the query sequence; determining at least one of a word boundary count and a non-word boundary count for each query sequence key, each word-boundary count and non-word boundary count being dependent on the context of the query sequence; and associating, in a data storage device, the at least one word boundary count and non-word boundary counts with each query sequence key. Other embodiments of this aspect include corresponding systems, apparatus, and computer programs, configured to perform the actions of the methods, encoded on computer storage devices.

Another innovative aspect of the subject matter described in this specification can be embodied in methods that include the actions of providing to a client device a search resource including interface instructions that cause the client device to generate a search interface that includes a query input field; receiving a query input from a client device, the query input having been input into the query input field and being one or more characters in a first input sequence constituting one or more words in a second input sequence; in response to receiving data indicating a determination that the query input received from a client device does not meet a query suggestion threshold: selecting a query input sequence from the query input, the query input sequence being up to a word n-gram of the most subsequent words of the one or more words in the second input sequence; determining a likelihood that the query input sequence terminates at a word boundary from the word boundary count and non-word boundary count associated with a query sequence key matching the query input sequence; and providing search results responsive to the client device at the expiration of a providing time delay that is based on the determined likelihood. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The word boundary likelihoods are at least bigram context sensitive. Search results provided on word boundaries that are at least bigram context sensitive have a higher precision than search results that are provided for word boundary likelihoods that are only unigram context sensitive, i.e., likelihoods that are based on the most recently entered string of characters in a query input defining a known word, or dictionary look-ups from language dictionaries. Additionally, word boundary likelihoods that are at least bigram context sensitive are more accurate in the context of proper nouns and new words that are not in a dictionary, thus increasing recall and precision over likelihoods that are unigram context sensitive, or dictionary look-ups. Providing search results for long-tail queries at the likely word boundaries thus achieves a goal of providing predictive search results that are relevant to a completed query or a completed portion of a query when accurate query predictions are not available. Consistent with that goal, search results that are likely to be relevant to the user's information needs are provided more quickly for long tail queries as compared to waiting for a user to input an explicit command to initiate a search. Furthermore, search results that are provided on word boundaries that are at least bigram context sensitive are more likely to satisfy a user's informational needs than search results that are provided for word boundary likelihoods that are only unigram context sensitive, thus enriching the user experience. Finally, unnecessary load on search servers is avoided, which allows the search system to scale more efficiently.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

This specification describes technologies relating to determining word boundary likelihoods in potentially incomplete textual inputs, such as long tail queries. As used herein, a word boundary likelihood is a likelihood that a textual input of one or more sequences of character inputs is at a word boundary. A word boundary is indicative of a sequence of one or more characters ending in a completed word for an n-gram context. In some implementations, the word boundary likelihood is used to determine whether a user typing text in a search input field has completely entered an input the user intended to type, and/or whether the user is done typing the current word the user is typing. The search system uses the word boundary likelihood to decide whether to provide search results responsive to the text that is entered in the search input field (which is also referred to as a "query input"). When the search system decides to provide search results, the search results are provided to a client device without receiving a search result request (e.g., without a user selecting a search command that causes the client device to send a search request to the search engine).

Depending on the word boundary likelihood, the search system may immediately provide search results to the client device, or may delay the provisioning of search results to the client device. The delay is, in some implementations, proportional to the likelihood. Thus, for a very high word boundary likelihood, e.g., 90%, search results may be provided immediately (or after a very short delay); conversely, for a very low word boundary likelihood, e.g., 15%, search results may be provided only after two seconds of inactivity at the client device. Alternatively, the search system may provide search results if the word boundary likelihood exceeds a threshold, and for all other cases in which the word boundary likelihood is less than the threshold, the search system may provide search results only after a fixed timeout.

In some implementations, the search system processes query logs to determine word boundary likelihoods. Each query stored in the query logs is one or more characters in a first sequence constituting one or more words in a second sequence. For each query, the search system selects query sequences from the query. Each query sequence is at least a portion of a word n-gram that is a subsequence of up to n words selected from the sequence of words of the query. For each query sequence, one or more query sequence keys are determined, and a word boundary count or a non-word boundary count associated with the query sequence keys are updated. As will be explained in more detail below, a word boundary is incremented if the query sequence ends in word boundary in the query, and a non-word boundary count is incremented if the query sequence ends in a non-word boundary in the query. After the queries are processed, the likelihood of a word boundary for each query sequence key is determined from the associated word boundary counts and non-word boundary counts.

§1.1 Example Environment

Figure 1:
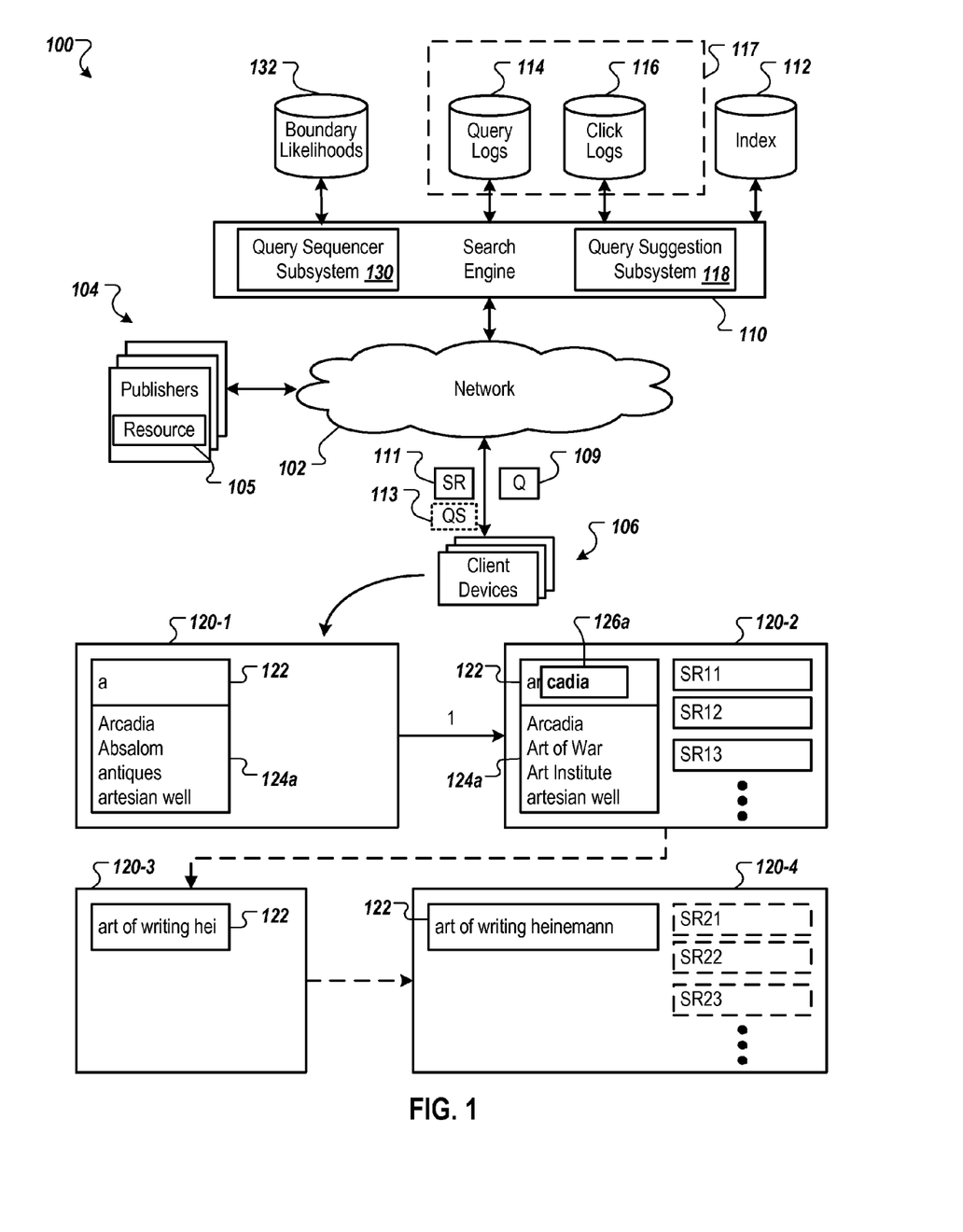
FIG. 1 is block diagram of an environment in which a search engine provides search services.

FIG. 1 is a block diagram of an example environment 100 in which a search engine 110 provides search services. A computer network 102, such as a local area network (LAN), wide area network (WAN), the Internet, or a combination thereof, connects publisher web sites 104, client devices 106, and the search engine 110. The online environment 100 may include many thousands of publisher web sites 104 and client devices 106.

A web site 104 is a one or more web page resources 105 associated with a domain name, and each web site is hosted by one or more servers. An example web site is a collection of web pages formatted in hypertext markup language (HTML) that can contain text, graphic images, multimedia content, and programming elements, such as scripts. Each web site 104 is maintained by a publisher, e.g., an entity that manages and/or owns the web site.

A resource is any data that can be provided by the publisher 104 over the network 102 and that is associated with a resource address. Resources include HTML pages, word processing documents, portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

A client device 106 is an electronic device that is under the control of a user and is capable of requesting and receiving resources over the network 102. Example client devices 106 include personal computers, mobile communication devices, and other devices that can send and receive data over the network 102. A client device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 identifies the resources by crawling the publisher web sites 104 and indexing the resources provided by the publisher web sites 104. The indexed and, optionally, cached copies of the resources are stored in an index 112.

The client devices 106 submit search queries 109 to the search engine 110. The search queries 109 are submitted in the form of a search request that includes the search request and, optionally, a unique identifier that identifies the client device 106 that submits the request. The unique identifier can be data from a cookie stored at the client device, or a user account identifier if the user maintains an account with the search engine 110, or some other identifier that identifies the client device 106 or the user using the client device.

In response to the search request, the search engine 110 uses the index 112 to identify resources that are relevant to the queries. The search engine 110 identifies the resources in the form of search results 111 and returns the search results to the client devices 106 in search results page resource. A search result is data generated by the search engine 110 that identifies a resource that satisfies a particular search query, and includes a resource locator for the resource. An example search result can include a web page title, a snippet of text extracted from the web page, and the URL of the web page.

The search results are ranked based on scores related to the resources identified by the search results, such as information retrieval ("IR") scores, and optionally a separate ranking of each resource relative to other resources (e.g., an authority score). In some implementations, the IR scores are computed from dot products of feature vectors corresponding to a query and a resource, and the ranking of the search results is based on relevance scores that are a combination of the IR scores and authority scores. The search results are ordered according to these scores and provided to the client device according to the order.

The client devices 106 receive the search results and render them for presentation to users. In response to the user selecting a search result at a client device 106, the client device 106 requests the resource identified by the resource locator included in the selected search result. The publisher of the web site 104 hosting the resource receives the request for the resource from the client device 106 and provides the resource to the requesting client device 106.

In some implementations, the queries 109 submitted from client devices 106 are stored in query logs 114. Click data for the queries and the web pages referenced by the search results are stored in click logs 116. The query logs 114 and the click logs 116 define search history data 117 that include data from and related to previous search requests associated with unique identifiers. The click logs define actions taken responsive to search results provided by the search engine 110. The query logs 114 and click logs 116 can be used to map queries submitted by the client devices to web pages that were identified in search results and the actions taken by users (i.e., that data are associated with the identifiers from the search requests so that a search history for each identifier can be accessed). The click logs 116 and query logs 114 can thus be used by the search engine to determine the sequence of queries submitted by the client devices, the actions taken in response to the queries, and how often the queries are submitted.

For situations in which the systems discussed here collect personal information (e.g., query history) about users, the users may be provided with an opportunity to opt in/out of programs or features that may collect the personal information. User may also be informed of the accompanying limitations on the functionality of a service that may result from limiting access to such personal information. In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user. Finally, the queries stored in the query logs may be deleted after a predetermined period of time. However, the word boundary likelihoods and non-word boundary likelihoods may be stored separately and retained.

§1.2 Query Suggestions and Query Suggestion Search Results

In addition to providing search results in response to queries, the search engine 110, by use of a query suggestion subsystem 118, provides query suggestions 113 to a client device. The query suggestions 113 can be provided by the search engine 110 in response to a query suggestion request from the client device. The query suggestion subsystem 118 accesses the search history data 117 and determines a list of query suggestions based on search queries that have the query characters as a stem (or, alternatively or in addition, queries that are related by topic or co-occurrence). In some implementations, the query suggestions are based on search history data 117 associated with the unique identifier of the client device that submitted the query suggestion request. For example, the query suggestions can be suggestions based on frequency co-occurrence and query stemming of queries stored in query logs 114, and then filtered according to the particular search history data 117 associated with the unique identifier.

To illustrate, assume a client device requests a search resource from the search engine 110. The search engine 110 provides the requested search resource and interface instructions to the client device. The search resource and interface instructions cause the client device to generate a search interface 120 that includes a query input field 122 (e.g., a home page for a search engine service). For example, the client device can launch a web browser and request a web, an image, or a video search page from the search engine 110. The search engine 110 can provide HTML and scripts that cause the client device to generate the search interface 120 with the query input field 122.

The query input field 122 can receive query characters from a user, e.g., keystroke inputs, and provides each input to the search engine 110. The query suggestion subsystem 118 identifies and ranks query suggestions for the query input according to an order from highest rank to a lowest rank, and provides the client device with the query suggestions 113. For example, the query suggestion subsystem 118 can access the search history data 117 and determine query suggestions based on search queries that have the query characters "ar" as a query stem, e.g., "Arcadia," "Art of War," "Art Institute", "artesian well," etc.

Various ranking algorithms can be used to rank the suggestions. In some implementations, the query suggestions are ranked based on the probability of the query suggestion being selected by a user. The client device receives the query suggestions 113 and renders the query suggestions according to an order. The query suggestions can be presented in a query suggestion box 124a according to an order from a highest rank to a lowest rank. For example, the client device can present the query suggestions in the query suggestion box 124a in the search interface 120-1, and the first query suggestion (e.g., "Arcadia") has the highest probability of being selected by a user, the second query suggestion (e.g., "Art of War") has the second highest probability, and so on.

The search engine 110 can provide search results with the query suggestions. For example, the search engine 110, when providing the query suggestions, determines if a prediction criterion is met. The prediction criterion is independent of a user selection of a query suggestion on the client device, and is independent of user selection on the client device to generate a search request, e.g., selection of a search button or the user pressing enter. When a prediction criterion is met, search results responsive to one of the query suggestions are sent to the client device and displayed.

The prediction criteria can be time based, probability based, or a combination of both. For a time based prediction criterion, the search engine 110 can determine that the prediction criterion is met when a timer initialized in response to the query suggestion request expires after a predefined time period and no additional query suggestion requests are received during the predefined time period. In some implementations, probability data indicates, for each query suggestion, a respective probability of being selected by the user. Thus, in some implementations, the prediction criterion can be based on this probability, or can be combined with a time-based prediction criterion. The search engine 110 can identify the query suggestion with the highest respective probability relative to the probabilities of the other query suggestions provided to the client device, and then determine that the prediction criterion is met when the highest respective probability of the query suggestion exceeds a threshold probability that is greater than zero.

The providing and displaying of search results in response to prediction criteria being met is illustrated in FIG. 1 in the first two of four time-sequenced representations 120-1-120-4 of the search resource 120. In the representation 120-1, the user has input the partial query "a". As used herein, a "partial query" is a query input that can be completed to form completed query of one or more words. A partial query can thus be one or more keyboard inputs that define a prefix or stem of a word, or can also be an entire word or words. For example, the letter "a" is a partial query, is the letter "a" is the stem for the words "aardvark," "Appalachia," etc. The partial query itself can also be a word, such as the letter "a" is a word.

The user is typing quickly and immediately enters the letter "r". Because the user entered the two letters quickly, search results for the suggestions shown in 124a are not provided. However, the user pauses long enough after entering the letter "r" that search results SR11, SR12, SR13 . . . are provided and displayed, as indicated in the representation 120-2. For example, the search results SR11, SR12, SR13 . . . may be responsive to the query suggestion "Arcadia," which is shown as a completion 126a.

In this example, however, the user is not interested in any of the subjects related to the suggestions. Instead, the user is search for information regarding a book entitled "The Art of Teaching Writing," published by Heinemann Publishing. The user thus continues typing in the query. For example, the user may enter "art of wr", and the search engine 110 may predict the query "art of writing" and show results for that query suggestion. However, the user omitted the word "teaching" in the title of the book, and the results do not satisfy the user's informational need. The user recalls the publisher name, and continues typing a query input of "art of writing hei." For this query input, the query suggestion system does not provide any query suggestions, as depicted in the representation 120-3. Thus, the search system 110 cannot provide search results based on query suggestions, and there are no query suggestions to use for search operations.

§1.3 Providing Search Results for Long Tail Queries

The query input "art of writing hei" is a portion of the long tail query the user intends to enter—"the art of writing heinemann." As used herein, a "long tail query" is a query that is unique or occurs relatively infrequently in a search volume of queries.

Figure 2:
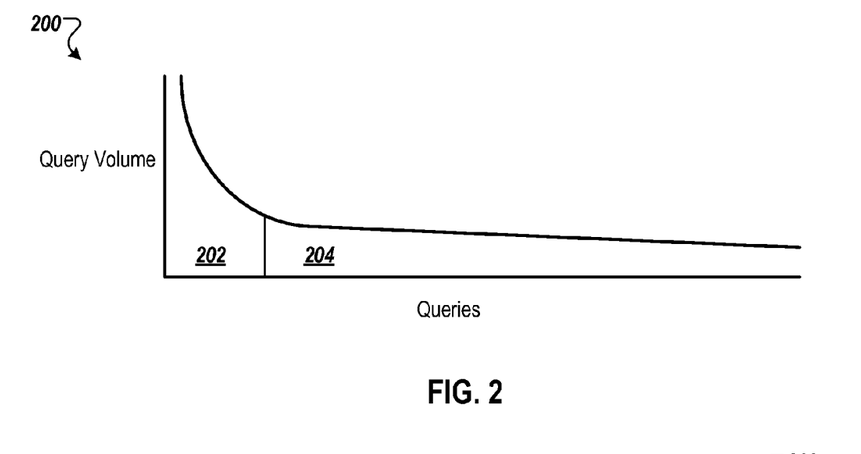
FIG. 2 is a graph of a query volume distribution.

The concept of a long tail query is illustrated in FIG. 2, which is a graph 200 of a query volume distribution. The queries that occur in the region 202 are queries that occur relatively often when compared to the queries that occur in the region 204. The search volume of queries in the region 204 asymptotically approaches zero, and thus the graph depicts a "long tail" of low search volume queries. Typically, query suggestions are readily determined for the queries in the region 202, but are often not determined for queries that occur in the region 204.

The distinct line separating the regions 202 and 204 is illustrative only and not necessarily indicative of the actual data. Typically, the separation between the regions 202 and 204 occurs across a band of queries, as the queries and volume of queries is constantly varying over time.

For such queries, the search engine 110 accesses a boundary likelihoods store 132 that stores boundary likelihoods for sequences of query inputs. Each sequence of query inputs can be up to a word n-gram, i.e., each sequence can be characters that define up to n sequential words in a query. In some implementations, n=2 words, and thus the query sequences constitute a character range from one character to the characters of a word bi-gram. As will be explained in more detail below, the search engine 110 selects up to the last complete or partial word n-gram of the query input as a query input sequence. Using the selecting query input sequence as a key, the search engine 110 accesses the boundary likelihoods data store 132 and searches for a matching key. The matching key is associated with a boundary likelihood, and from the boundary likelihood the search system 110 determines whether and when to provide search results responsive to the query input.

For example, for the query "art of writing hei," and with n=2, the search engine selects the query input sequence "writing hei." As very few queries (or perhaps no queries) stored in the query logs 114 end in this sequence, or otherwise include this particular sequence of words where "hei" is either followed by a space or is the end of the query the user intends to input, the boundary likelihood is very low. Accordingly, search results are not provided for the query "art of writing hei" as it is very unlikely the user has finished entering the query. With each keystroke, the query input sequence is revised, e.g., "writing hein", "writing heine", "writing heinem", and so on. As each query input sequence corresponds to a low boundary likelihood, search results are not provided. However, when the user inputs the last character n, resulting in "art of writing heinemann" the word boundary likelihood is very high, and search results SR21, SR22, SR23 . . . responsive to the query input "art of writing heinemann" are shown, as depicted in the representation 120-4.

In this particular example, "heinemann" is not a dictionary terms, but is the name of a publishing entity. Thus the boundary likelihood is relatively high for "heinemann". The boundary likelihoods are also context sensitive. For example, the word "he" is a known unigram in the English language. However, in the context of being preceded by the word "hilton,", i.e., "hilton he", the boundary likelihood is relatively low, this particular subsequence corresponds the words "hilton head" in most queries.

By way of another example, the query input "top rated school districts in atlanta ga" results in a high word boundary likelihood, as the query input sequence "atlanta ga" most often defines a word boundary. Conversely, for a user searching for mobile device games, the query input sequence "top rated Android ga" results in a low word boundary likelihood, as this particular query is likely to be incomplete, even though this query ends with the same two characters as the school district query.

Example processes for determining word boundary likelihoods, and example processes for providing search results are described in more detail below.

§2.0 Determining Word Boundary Likelihoods

Figure 3:
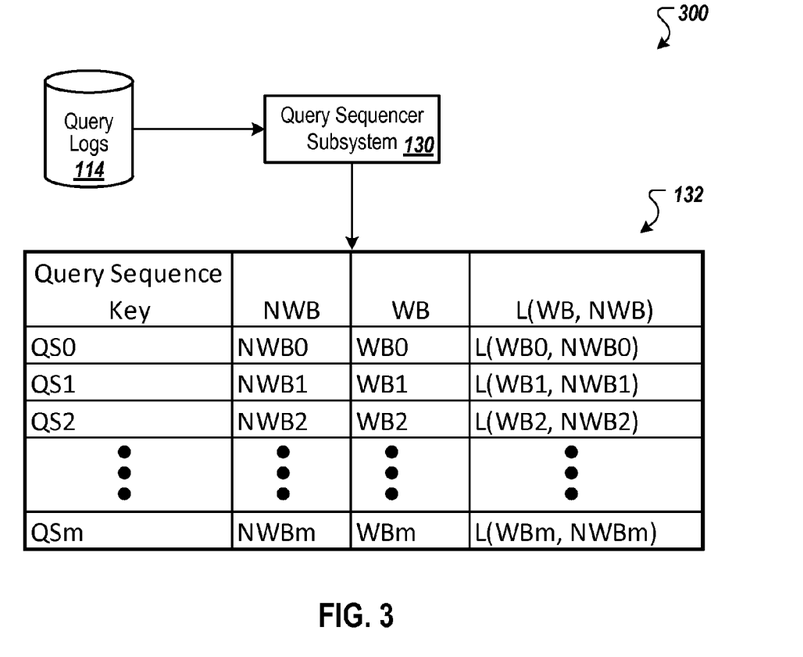
FIG. 3 is a system flow diagram of a process for generating word boundary likelihoods.

FIG. 3 is a system flow diagram of a process 300 for generating word boundary likelihoods. Although the process 300 generates a data store storing word boundary likelihoods and word and non-word boundary counts, the process 300 can be modified to store only word boundary likelihoods, or store only the word and non-word boundary counts. In the latter case, the word boundary likelihoods can be computed at query run time.

Figure 4:
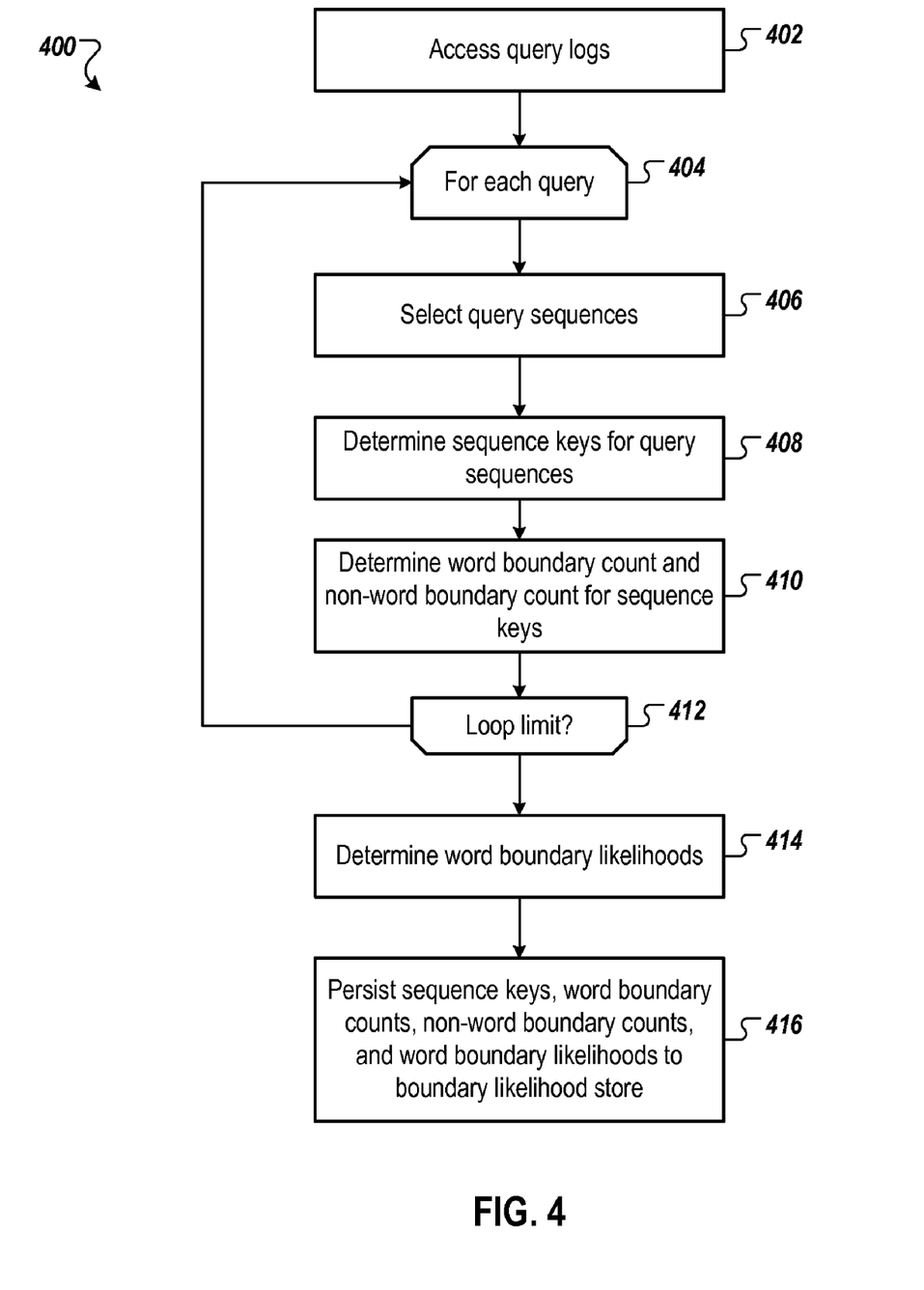
FIG. 4 is a flow diagram of an example process for determining word boundary counts, non-word boundary counts, and word boundary likelihoods.
Figure 5:
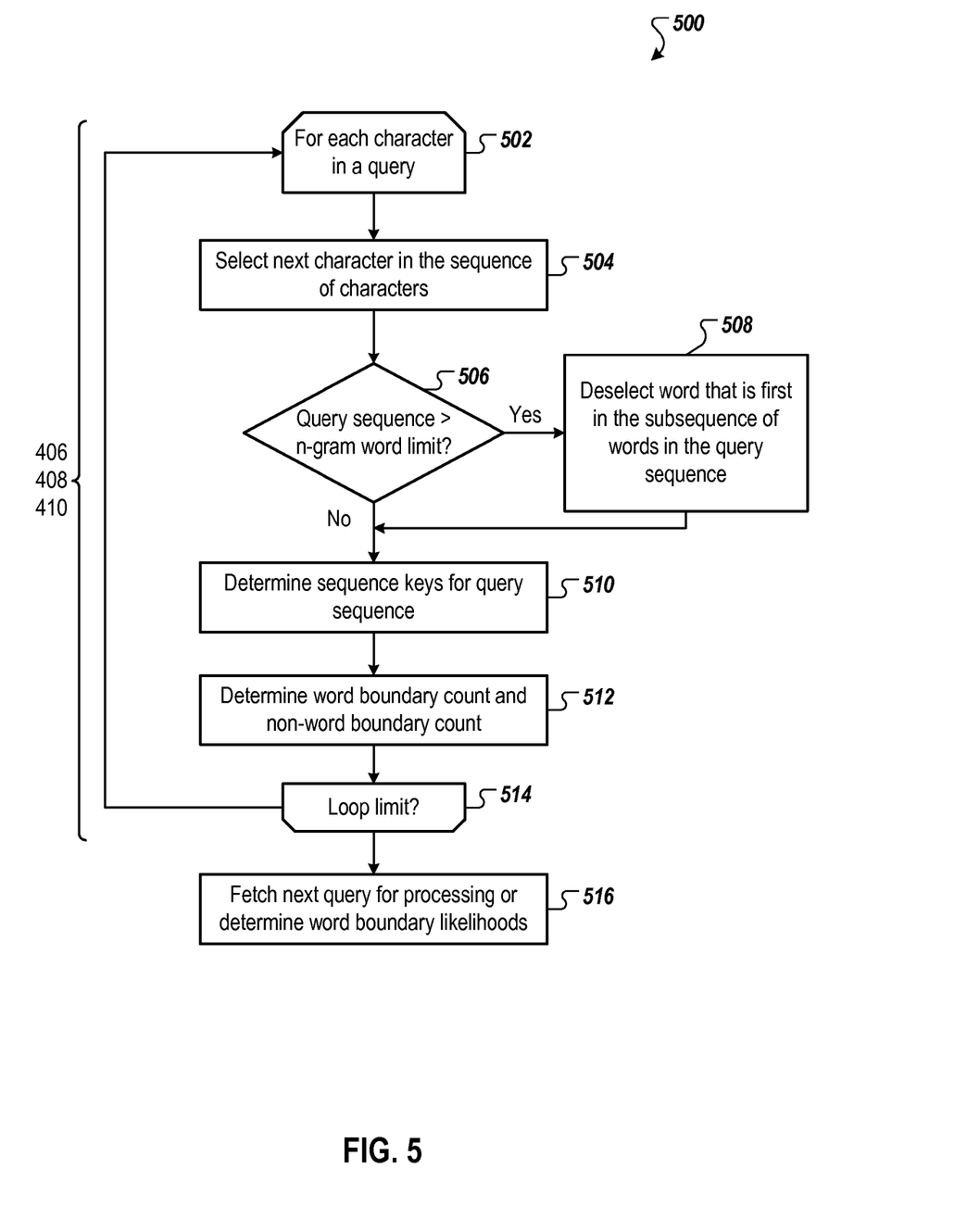
FIG. 5 is a flow diagram of an example process for selecting query sequences from a query and determining word boundary counts and non-word boundary counts for the query sequence.

In some implementations, a query sequencer subsystem 130 accesses the query logs 114 and selects query sequences from each query. Each query sequence is at least a portion of an n-gram that is a subsequence of up to n words selected from the sequence of words of the query. For each query sequence, one or more query sequence keys QS are determined, and a word boundary count WB and/or a non-word boundary count NWB associated with the query sequence keys QS are updated. A word boundary is incremented if the query sequence ends in word boundary in the query, and a non-word boundary count is incremented if the query sequence ends in a non-word boundary in the query. After the queries are processed, the boundary likelihood L of a word boundary for each query sequence key is determined from the associated word boundary counts and non-word boundary counts. FIGS. 4 and 5 describe example implementations of this process in more detail.

FIG. 4 is a flow diagram of an example process 400 for determining word boundary counts, non-word boundary counts, and word boundary likelihoods. The process 400 can be implemented in a data processing apparatus (e.g., one or more computers and associated storage devices). The process is described in the context of an iterative example to illustrate the processing of a query and how word boundary counts and non-word boundary counts are determined. The process 400 can be modified so the determinations result from a parallelized algorithm, depending on the system architecture used and processing capabilities available.

The process 400 accesses query logs (402). For example, the query logs 114 of a search engine 110 can be accessed.

The process 400 begins a process loop for processing queries in the query log (404). Not all queries in the query log need be processed; however, for each query that is processed, the same loop operations are performed.

The process 400 selects query sequences (406). Each query sequence is least a portion of a word n-gram that is subsequence of up to n words selected from the sequence of words of the query. For example, for the query "one two three" and a word bi-gram (n=2 words) context, the query sequences range from the single letter "o" to the last two words in the query "two three." For a tri-gram (n=3) context, the query sequences range from the single letter "o" to the last three words in the query, which is the entire query "one two three." An example process for selecting query sequences is described in more detail in FIG. 5.

The process 400 determines sequence keys for the query sequences (408). For example, for each query sequence, a first query sequence key is determined for the entire query sequence, and, if the query sequence includes more than a unigram, a second query sequence key is for a last subsequence of characters in the query sequence that constitute only a unigram or only a portion of a unigram in the query is determined. If the query sequence is only a unigram (e.g., a sequence of letters without a space, or a sequence of characters that are interpreted as a single word), then only one sequence key is determined. For example, for the query sequence "on", selected from the query "one two three," only one query sequence key is determined, i.e., "on." For the query sequence "one tw," two query sequence keys are determined—"one tw" and "tw."

In some implementations, the number of query sequence keys for a query sequence is equal to or less than the n-gram word limit. For example, for a bi-gram word limit, up to two query sequence keys are determined, e.g., the query sequence "one tw" results in query sequence keys "one tw" and "tw."

For a tri-gram word limit, the query sequence "one two th" results in query sequence keys "one two th," "two th" and "th."

Alternatively, fewer query sequence keys can be determined, e.g., only two, the first being for the entire query sequence, and the second being the last unigram or portion of a unigram in the query. Thus, for the query sequence "one two three", the query sequence keys are for "one two three" and "three."

The process 400 determines a word boundary count and a non-word boundary count for the query sequences and associates the counts with the query sequence keys (410). The determination of whether a query sequence ends in a word boundary is dependent on the context of the query from which the query sequence was selected. For example, even though the characters "on" form a word, in the context of the query "one two three", the query sequence "on" is not at a word boundary, as the letters are followed by the letter "e", which is indicative of a non-word boundary. Conversely, the query sequence "one two" does end at a word boundary, as the unigram "two" is followed by a subsequent character next in sequence that is indicative of or a word boundary, e.g., a space. Other characters that are indicative of word boundaries include punctuation characters that follow completed words (e.g., commas, periods, question marks, etc.). The word boundary and non-word boundary counts are incremented for each query sequence key when a word boundary or non-word boundary is determined for each query sequence key.

The process 400 determines if the loop limit is met (412). A variety of conditions can determine the loop limit, e.g., processing all queries in the query logs, processing only long-tail queries, processing a maximum number of random samples of all queries in the query logs, etc.

If the loop limit is not met, the process 400 selects another query to process. Otherwise, if the loop limit is met, the process determines word boundary likelihoods (414). In some implementations, the boundary likelihoods L are based on a function of the word boundary counts and non-word boundary count for each query sequence key. For example, in some implementations, the boundary likelihood for each query sequence key is determined according to the following formula:

$$L=WB/(WB+NWB)$$

where WB is the word boundary count and NWB is the non-word boundary count associated with the query sequence key.

The process 400 then persists the query sequence keys, word boundary counts, non-word boundary counts, and word boundary likelihoods to a data store (416). The data are then used for subsequent operations, such as, for example, determining whether and when to provide search results for a long-tail query input.

FIG. 5 is a flow diagram of an example process 500 for selecting query sequences from a query and determining word boundary counts and non-word boundary counts for the query sequence. The operations 502-514 are an example implementation of the operations 406-410 of the process 400 of FIG. 4.

The process 500 begins a process loop for processing a query (502). In particular, the process 500 selects query sequences for each character in a query. For example, for the query "one two three", the process 500 will determine sequences based on each character in the query.

The process 500 selects a next character in the sequence of characters in the query (504). In some implementations, the next character is either a first character of the sequence of characters (i.e., when the processing of the query beings), or a character that is next in sequence to a most recently selected next character in the sequence of characters (e.g., after the first iteration of the query processing loop). For example, for the query "one two three", when the query is initially processed during the first loop iteration, the next character is the character "o" from the word "one." When the query is processed on the second iteration, the next character is the letter "n."

In some implementations, if the next character is a character indicative of word break, then that character and the next subsequent character is selected (or the next character that indicates a new words, such as may be the case in which a query has two spaces between two consecutive words). This prevents double counting of word boundaries. For example, if the current query sequence is "one", the next character is a space; accordingly, the next character that is not indicative of word boundary is also selected, i.e., "t", and thus the next query sequence that occurs after "one" is "one t." In some implementations, if there are more than two non-word characters, the query sequence is normalized so that it includes only one of the non-word characters. This allows for word and non-word counts to be attributed for queries that would otherwise likely be unique due to typing errors, e.g., a query that includes multiple spaces between two or more words, such as "art of writing  heinemann."

The process 500 then determines wither the query sequence is greater than an n-gram word limit. For example, if the process 500 determines that query sequence constitutes more than a subsequence of n words from the sequence of words of the query, then the query sequence is greater than the n-gram word limit. To illustrate, suppose the last query sequence processed was "one tw" for a bi-gram limit. The next character selected for the sequence is "o", for a query sequence of "one two." As the terms "one two" do not exceed the bi-gram limit, the query sequence is accepted for further processing. However, on the next iteration, the query sequence is "one two t." As this query sequence is more than the bi-gram limit (i.e., the bi-gram "one two" and a portion of a unigram—"t"), the query sequence constitutes more than a subsequence of two words in the context of the query.

If the query sequence constitutes more than the subsequence of up to n words the process 500 deselects a word that is first in the subsequence of words in the query sequence. For example, for the query sequence "one two t", the word "one" is deselected, resulting in a query sequence of "two t."

The process determines sequence keys for the query sequence (510). As described above, a first query sequence key is determined for the entire query sequence, and a second query sequence key is for a last subsequence of characters in the query sequence that constitute only a unigram or only a portion of a unigram in the query.

The process 510 determines a word boundary count and/or a non-word boundary count for the for the sequence keys. For example, as described above, the determination of whether a query sequence ends in a word boundary is dependent on the context of the query from which the query sequence was selected. If the query subsequence ends in a word boundary, then a word boundary count associated with the query sequence keys is incremented. Conversely, if the query subsequence ends in a non-word boundary, then a non-word boundary count associated with the query sequence keys is incremented.

The process 500 determines if the loop limit is met (514). If there are no more characters to process in the query, then the loop limit is met; otherwise, the process 500 generates the next query sequence for the query.

If the loop limit is met, the process 500 fetches the next query to process, or, if all queries have been processed, determines the word boundary likelihoods (516).

The following example for the query "one two three" illustrates the process 500 in more detail. For ease of illustration, the process 500 is described in a bi-gram context. Table 1 below illustrates the processing of the first three characters of the query sequence, resulting in three query sequence keys and their corresponding non-word boundary counts and word boundary counts.

TABLE 1

| Query Sequence Key | NWB | WB |
|---|---|---|
| o | 1 | 0 |
| on | 1 | 0 |
| one | 0 | 1 |

As the process 500 increment through the query character, query sequence keys are determined and non-word and word boundary counts are determined and stored. For the query sequence "one t", however, two query sequence keys are determined, "one t" and "t". The resulting data are shown in Table 2 below.

TABLE 2

| Query Sequence Key | NWB | WB |
|---|---|---|
| o | 1 | 0 |
| on | 1 | 0 |
| one | 0 | 1 |
| one t | 1 | 0 |
| t | 1 | 0 |

Thereafter, two query sequence keys are determined for each subsequent query sequence. For example, processing the query sequence "one tw" results in the data shown in Table 3.

TABLE 3

| Query Sequence Key | NWB | WB |
|---|---|---|
| o | 1 | 0 |
| on | 1 | 0 |
| one | 0 | 1 |
| one t | 1 | 0 |
| t | 1 | 0 |
| one tw | 1 | 0 |
| tw | 1 | 0 |

Data resulting from the processing of the entire query "one two three" is shown in Table 4 below. The non-word boundary for the query sequence key "t" is two, as the query sequence key is encountered twice, once for "one t" and once for "two t."

TABLE 4

| Query Sequence Key | NWB | WB |
|---|---|---|
| o | 1 | 0 |
| on | 1 | 0 |
| one | 0 | 1 |
| one t | 1 | 0 |
| t | 2 | 0 |
| one tw | 1 | 0 |
| tw | 1 | 0 |
| one two | 0 | 1 |
| two | 0 | 1 |

TABLE 4-continued

| Query Sequence Key | NWB | WB |
|---|---|---|
| two t | 1 | 0 |
| two th | 1 | 0 |
| th | 1 | 0 |
| two thr | 1 | 0 |
| thr | 1 | 0 |
| two thre | 1 | 0 |
| thre | 1 | 0 |
| two three | 0 | 1 |
| three | 0 | 1 |

The query sequence keys are not unique to a particular query. If a query sequence key is encountered for a subsequent query, then the non-word boundaries and word boundaries for the query sequences key are again updated. For example, suppose the query "one threes" is the next query processed after the query "one two three." The resulting data are shown in Table 5.

TABLE 5

| Query Sequence Key | NWB | WB |
|---|---|---|
| o | 2 | 0 |
| on | 2 | 0 |
| one | 0 | 2 |
| one t | 2 | 0 |
| t | 3 | 0 |
| one tw | 1 | 0 |
| tw | 1 | 0 |
| one two | 0 | 1 |
| two | 0 | 1 |
| two t | 1 | 0 |
| two th | 1 | 0 |
| th | 2 | 0 |
| two thr | 1 | 0 |
| thr | 2 | 0 |
| two thre | 1 | 0 |
| thre | 2 | 0 |
| two three | 0 | 1 |
| three | 1 | 1 |
| one th | 1 | 0 |
| one thr | 1 | 0 |
| one thre | 1 | 0 |
| one three | 1 | 0 |
| one threes | 0 | 1 |
| threes | 0 | 1 |

Only the query sequence keys "one th", "one thr", "one thre", "one three" "one threes" and "threes" are added to Table 4 to result in the query sequence keys of Table 5. The query sequence keys "o", "on", "one", "t", "th", "thr", "thre" and "three" have been previously determined, and thus the counts for theses query sequence keys are updated. Note that after processing the second query, the character string "three" has only a 50% likelihood that it occurs at a word boundary. This is because the string "three" has been encountered twice. For the first query "one two three", the string occurred at a word boundary, but for the second query "one threes", the string did not occur at a word boundary.

§3.0 Long Tail Query Processing

Figure 6:
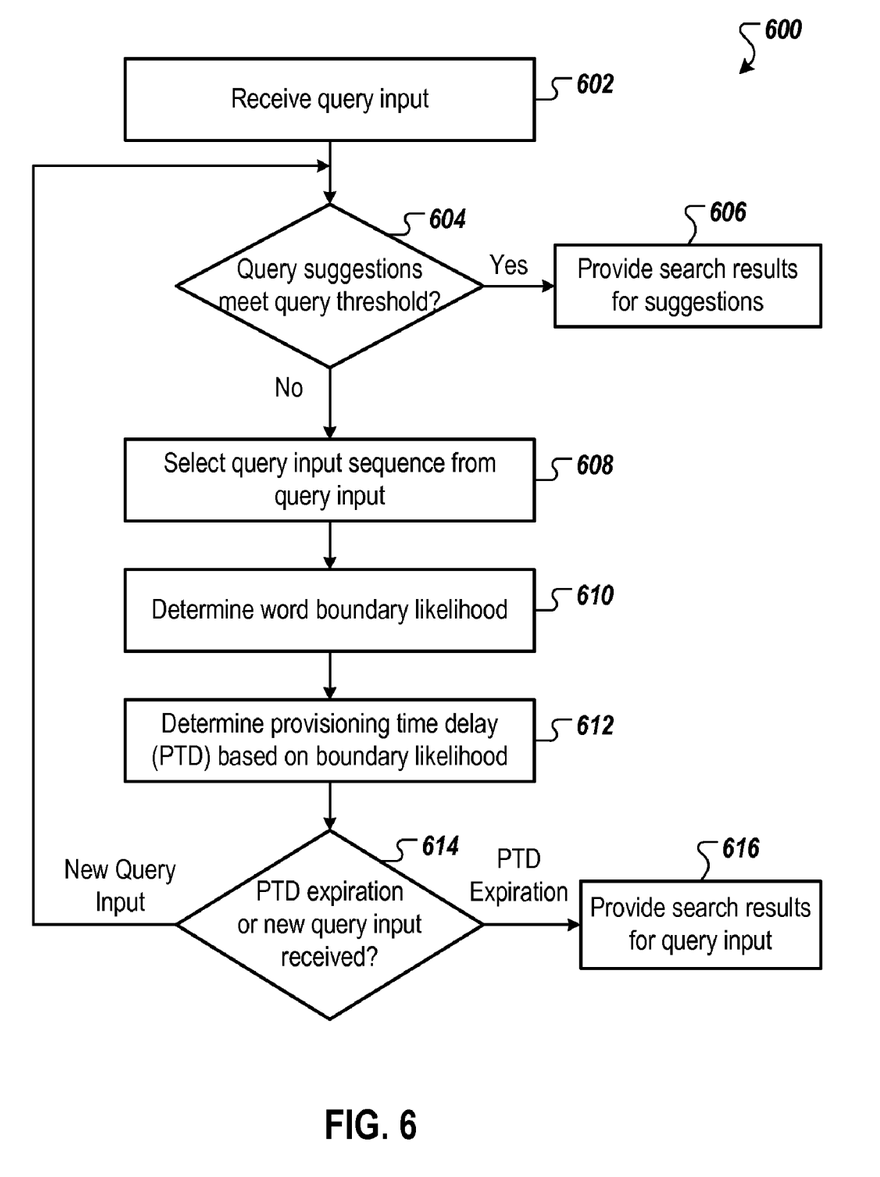
FIG. 6 is a flow diagram of an example process for providing search results based on a word boundary likelihood.

FIG. 6 is a flow diagram of an example process 600 for providing search results based on a word boundary likelihood. The process 600 can be implemented in a data processing apparatus (e.g., one or more computers and associated storage devices), and is used to determine whether and when to provide search results for a query input when no query suggestions are determined for the query input. The process 600 is illustrated in a bi-gram context.

The process 600 receives a query input (602). The query input is one or more characters in a first input sequence constituting one or more words in a second input sequence. For example, the process 600 may receive the query input "ar", as illustrated in the search resource representation 120-2 of FIG. 1.

The process 600 determines if query suggestions for the query input meet a query suggestion threshold (604). In some implementations, the query suggestion threshold is met if any query suggestions are provided. In other implementations, the query suggestion threshold is met if a confidence score (e.g., a probability of selection by a user) associated with one or more query suggestions meet a threshold confidence value. Other query suggestion thresholds can also be used.

The process 600 is notified of the query suggestions the query suggestion subsystem 118 provides (or fails to provide). If the query suggestion threshold is met, the process 600 then provides search results for at least one of the suggestions (606), as shown in representation 120-2.

If the query suggestion subsystem 118 does not provide search suggestions, e.g., the query is a long-tail query or a query for which no suggestions are available or determined, or if the query suggestion threshold is otherwise not met, then the process 600 selects a query input sequence from the query input (608). For example, as shown in the representation 120-3, no query suggestions are shown for the query input "art of writing he". In some implementations, the query input sequence is a sequence that is up to word n-gram of the most subsequent words of one or more words in the query input. For the case of n=2, the query input sequence that is selected for "art of writing he" is "writing he."

The process 600 determines a word boundary likelihood (610). For example, the process 600 uses the query input sequence as a key, and determines the likelihood that the query input sequence terminates at a word boundary from the word boundary count and non-word boundary count associated with a query sequence key matching the query input sequence.

The process determines a provision time delay (PTD) based on the boundary likelihood (612). In some implementations, the provisioning time delay is used to determine when to provide search results that are responsive to a query input. For example, if the word boundary likelihood is very high, indicating that the query is very likely at a word boundary and that the user has finished typing in a complete word, then search results responsive to the query input can be provided after a relatively short time delay, or even immediately. Conversely, if the word boundary likelihood is very low, indicating that the query is very likely not at a word boundary and that the user has not finished typing in a complete word, then the search results may only be provided after a provisioning time delay, e.g., two seconds.

In some implementations, the length of the provisioning time delay is in inverse proportion to the likelihood that the query input sequence terminates at a word boundary. The inverse proportion can be linear, e.g., $$PTD = M(1-L)$$

where M is a maximum time delay (e.g., 1 second) and L is the word boundary likelihood.

Other time delay functions can also be used, such as:

$$PTD = M(\exp(1-L)-1)$$

In other implementations, the provisioning time delays can be discretized according to predefined likelihood ranges, e.g., 0 seconds for L>0.95; 100 ms for 0.85<L<0.95; 200 ms for 0.75<L<0.85; and so on. In general, a variety of functions that monotonically decreases with increase in word boundary likelihoods can be used.

The process 600 determines if the PTD has expired, or if a new query input is received (614). For example, a countdown timer counts down the provisioning time delay. If a new query input is not received before the timer counts down, then search results are provided for the query input (616). For example, the process will instruct the search engine to search using the current query input and provide search results to the client device.

Conversely, if a new query input is received before the expiration of the provisioning time delay, then the process 600 repeats the operations described above. For example, with reference to FIG. 1, the user continues to input the query "art of writing heinemann", and when the user enters the last "n" for "heinemann", the process uses the query sequence "writing heinemann" as a query sequence key and determines that the word boundary likelihood is very high. Accordingly, the search results SR21, SR22, SR23 . . . are provided after a very short time delay (or no time delay), as depicted in the representation 120-4 of FIG. 1.

Figure 7:
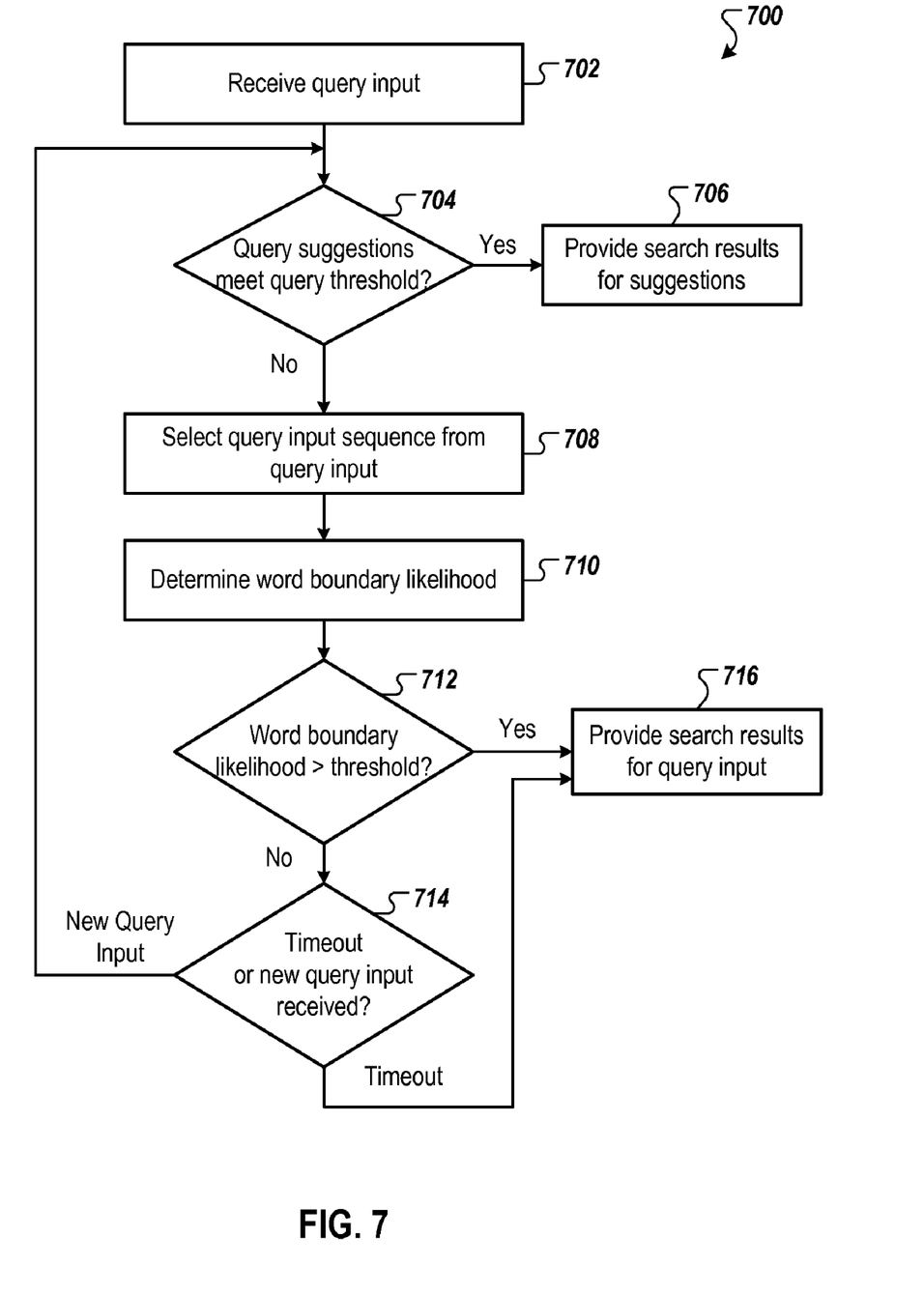
FIG. 7 is a flow diagram of another example process for providing search results based on a word boundary likelihood.

FIG. 7 is a flow diagram of another example process 700 for providing search results based on a word boundary likelihood. The process operations 702, 704, 706, 708 and 710 are similar to the process operations 602, 604, 606, 608 and 610 of FIG. 6. However, the time delay process is different from that of FIG. 6. In particular, the process 700, at 712, determines if the word boundary likelihood exceeds a threshold, e.g., 85%.

If the word boundary likelihood exceeds the threshold, then the process 700 provides search results for the query input without a time delay (716). Otherwise, the process 700 determines if a fixed time (or, alternatively, a variable timeout) has expired, or if a new query input is received (714). If the fixed time expires before a new query input is received, then the process 700 provides the search results for the query input (716). Otherwise, the process 700 repeats the operations described above.

§4.0 Additional Processing Examples

Various additions or modifications to the processes described above can be implemented. For example, in some implementations, instead the process 500 determining whether the query sequence is greater than an n-gram word limit, the process 500 can first determine if a previously selected query sequence constitutes a subsequence of n words, and in response to a positive determination, deselect a word that is first in the subsequence of words in the query sequence. Thereafter, the next character in the query sequence is selected.

Additionally, the processes have been described in an iterative implementation. Queries and likelihoods can also be processed in a parallel fashion, depending on the system architecture of the system that is used to implement the subject matter described above.

To save space in the word boundary likelihood data store, and to increase processing efficiency, n-grams and/or unigrams that always occur at non-word boundaries can be deleted from the data store. The system is then programmed to equate a query sequence that results in a miss in the word boundary likelihood data store with a very low likelihood of a word boundary, e.g., 0.

In some implementations, the system can implement a unigram (or n–q gram, where q<n) fallback process that is instantiated when an n-gram query input sequence does not correspond to a query sequence key (i.e., the query input sequence is a unique sequence that has not been previously encountered or is not stored in the word boundary likelihood store). For example, in a bi-gram context, the query input sequence that constitutes at least one word and at least a portion of another word subsequent to the at least one word (e.g., "writing hei," where "writing" is the one word and "hei" is the portion of the other word subsequent to the one word), the portion of the last word is used as the query sequence key if the bi-gram results in a miss. The sequencer 130 uses only the terminal portion of the query sequence (i.e., the last unigram or portion of the last unigram) to search for a fallback query sequence key. The sequencer uses the fallback sequence key to determine a likelihood that the query input sequence terminates at a word boundary from the word boundary count and non-word boundary count associated with the fallback query sequence key. This modification can be used in conjunction with the modification described in the previous paragraph, provided that only the bigrams that always occur a non-word boundaries are deleted only if the bigrams occur very infrequently, e.g., are below a search volume minimum threshold.

In some implementations, the provisioning time delay for word boundary likelihoods on words that are indicative additional query input can be lengthened. Examples of such words include stop words, i.e., words that are usually ignored by search engines. To illustrate, for the query input "art of writing heinemann and", the word boundary likelihood may be very high. However, the word "and" is indicative of additional input, and thus the provisioning time delay can be lengthened, as it is unlikely the user has finished entering the query. For example, when words that are indicative of additional input are encountered with a high word boundary likelihood, and additional time of 150 milliseconds (or some other time) is added to the provisioning time delay. Additionally, longer time delays can be used for any term or character that that indicates additional input, such as commas and hyphens.

Similarly, the provisioning time delay for word boundary likelihoods on words that are indicative of an end of a query input can be shortened. For example, words such as "review" and "price" are often used as the last term of a query (e.g., "computer games price" or "air conditioner review"). Thus, even if the word boundary likelihood may not extremely high (e.g., many queries may end in plural forms of the words, reducing the word boundary likelihood), the system can still provide search results with a higher level of confidence that the search results for the query input will satisfy the user's informational need.

In some implementations, the query sequence is cursor sensitive. For example, if the user entering the query "art of writing heinemann" stops and moves the cursor between "of" and "writing", and then begins typing the word teaching, the query input sequences that are generated are "of t", "of te," "of tea" and so on. Thus, the query input sequences can be determined from characters that immediately precede the cursor in an input field. Thus, even though the query input ends in a bi-gram that has a very high word boundary likelihood, results are not shown as the user is exhibiting behavior indicative of the query not being an accurate expression of the user's need for information.

In variations of this implementation, the word in which the cursor is inserted is considered. For example, suppose the user entering the query "reviews for Italian restaurants" decided to search for reviews of Italian and Indian restaurants. The user moves the cursor between "I" and "t", and then begins typing letters to form the word "Indian" before the word "Italian." The query sequences that are generated, in a bigram context, would be, for each entry:

Intalian restaurants;
Indtalian restaurants . . . ;
IndianItalian restaurants; and
Indian Italian.

Other cursor-aware models can also be used.

Although query logs are used to determine word boundary likelihoods, other sources of information can also be used. For example, a document corpus can be used to determine word boundary likelihoods. An example of a document corpus is a collection of web documents. Such documents can include web pages, word processing files, query logs, instant messenger (IM) messages, blog entries, bulletin board system (bbs) postings or other data sources that include word data. The processes described herein can also be used in other languages and for other writing systems. For example, for CJK systems, a segmenting feature can be added to determine a probability that a word segment is encountered.

To reduce processing requirements and increase scalability and accuracy, word boundary likelihoods can be determined for only queries for which the suggestion subsystem 118 does not provide suggestions. This variation has the effect of biasing the probabilistic models over cases that do not have suggestions, and thus this variation is especially suited for applications in which a remedial action (e.g., providing search results) is needed in the absence of suggestions. For example, suppose for the query "one two three", the suggestion subsystem stops providing suggestions for "one two th." The query sequencer subsystem 130 provides each query sequence to the query suggestions subsystem 118. When the query sequence 130 receives no query suggestions, it then determines query sequence keys for the query sequence and determines word counts and non-word counts.

In some implementations, the entire query input is used as a search query when the system determines that search results are to be provided. However, in other implementations, when the word boundary likelihood is low, or below a minimum threshold the last sequence of characters that constitute the portion of the last unigram are excluded from the search query. For example, for the query input "art of writing hei", the word boundary likelihood is very low. Accordingly, after a provisioning time delay timeout, only the query input "art of writing" is used as a search query. In other implementations, the term "hei" may be autocompleted without context, and used as a query term in addition to "art of writing." For example, the query "art of writing hei" may result in the query "art of writing heinz" if "heinz" is the highest rated suggestion for "hei." Even more generally, terms can be dropped from the start of the query when considering whether suggestions are available. For example, the suggestion system may search for suggestions for [of writing hei], and then [writing hei] in that order, and then search for suggestions for [hei] without any context.

In some implementations, the provisioning time delays can be lengthened in proportion to the network latency. For example, for mobile devices, the provisioning time delays can be longer (e.g., doubled or tripled) with respect to a wired network connect with very low latency.

In some implementations, stop words in query logs can be ignored when determining word boundary likelihoods, or, alternatively, the query logs can be processed for word boundary likelihoods with stop words and without stop words. Many users do not type in stop words when typing queries, while many other users do use stop words. Accordingly, computing word boundary likelihoods that take into account stop words and that ignore stop words results in a more robust word boundary likelihood model. For example, when processing a query, the query sequencer 130 can implement the processes described above in a dual mode, the first mode taking into account stop words in the word n-gram context, and the second mode ignoring stop words in the word n-gram context. At run time, query inputs that include stop words can be dual processed as well, and the word boundary likelihood that is the highest (e.g., the highest of likelihoods based on a query sequence with stop words and likelihoods based on a query sequence without stop words) can be selected for the final word boundary likelihood for the query.

§5.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
  a data processing apparatus; and
  a computer storage medium encoded with a computer program, the program comprising data processing apparatus instructions that when executed by the data processing apparatus cause the data processing apparatus to perform operations comprising:
  accessing queries stored in query logs, each query being one or more characters in a first sequence constituting one or more words in a second sequence;
  for each query:
    selecting query sequences from the query, each query sequence being at least a portion of a word n-gram, the word n-gram being a subsequence of up to n words selected from the second sequence of words of the query, and for each selected query sequence:

determining one or more query sequence keys for the query sequence;

determining at least one of a word boundary count and a non-word boundary count for each query sequence key, each word-boundary count and non-word boundary count being dependent on the context of the query sequence; and associating, in a data storage device, the at least one word boundary count and non-word boundary counts with each query sequence key.

2. The system of claim 1, wherein selecting a query sequence from the query comprises:

selecting a next character in the first sequence of characters, the next character being either a first character of the first sequence of characters or a character that is next in sequence to a most recently selected next character in the first sequence of characters;

determining whether the query sequence constitutes more than a subsequence of up to n words from the second sequence of words of the query; and in response to determining that the query sequence constitutes more than the subsequence of up to n words, deselecting a word that is first in the subsequence of words in the query sequence.

3. The system of claim 2, wherein determining one or more query sequence keys for the query sequence comprises:

determining a first query sequence key that is a key for the entire query sequence;

determining a second query sequence key that is a key for a last subsequence of characters in the query sequence that constitute only a unigram or only a portion of a unigram in the query.

4. The system of claim 3, wherein determining at least one of a word boundary count and a non-word boundary count for each query sequence comprises:

determining whether the query sequence ends in a word boundary;

in response to determining whether the query sequence ends in a word boundary, incrementing a word boundary count for the first query sequence key and incrementing a word boundary count for the second query sequence key; and in response to determining whether the query sequence ends in a non-word boundary, incrementing a non-word boundary count for the first query sequence key and incrementing a non-word boundary count for the second query sequence key.

5. The system of claim 4, wherein determining whether the query sequence ends in a word boundary comprises:

selecting a subsequent character the subsequent character being a character that is next in sequence to a character that is last in the subsequence of the query sequence;

determining that the query sequence ends in a word boundary if the subsequent character is indicative of a word boundary; and determining that the query sequence ends in a non-word boundary if the subsequent character is indicative of a non-word boundary.

6. The system of claim 5, wherein:

the subsequent character is indicative of a word boundary when the subsequent character is a space character; and the subsequent character is indicative of a non-word boundary when the subsequent character is a letter character.

7. The system of claim 1, wherein:

selecting a query sequence from the query comprises:

determining whether a previously selected query sequence constitutes a subsequence of n words from the second sequence of words of the query, and in response to determining that the previously selected query sequence constitutes a subsequence of n words from the second sequence of words of the query, deselecting a word that is first in the subsequence of words in the query sequence; and selecting a next character in the first sequence of characters, the next character being a character that is next in sequence to a most recently selected next character in the first sequence of characters;

determining one or more query sequence keys for the query sequence comprises:

determining a first query sequence key that is a key for the entire query sequence; and determining a second query sequence key that is a key for a last subsequence of characters in the query sequence that constitute only a unigram or only a portion of a unigram in the query; and determining at least one of a word boundary count and a non-word boundary count for each query sequence comprises:

determining whether the query sequence ends in a word boundary;

in response to determining whether the query sequence ends in a word boundary, incrementing a word boundary count for the first query sequence key and incrementing a word boundary count for the second query sequence key; and in response to determining whether the query sequence ends in a non-word boundary, incrementing a non-word boundary count for the first query sequence key and incrementing a non-word boundary count for the second query sequence key.

8. The system of claim 7, wherein determining whether the query sequence ends in a word boundary comprises:

selecting a subsequent character the subsequent character being a character that is next in sequence to a character that is last in the subsequence of the query sequence;

determining that the query sequence ends in a word boundary if the subsequent character is indicative of a word boundary; and determining that the query sequence ends in a non-word boundary if the subsequent character is indicative of a non-word boundary.

9. The system of claim 8, wherein:

the subsequent character is indicative of a word boundary when the subsequent character is a space character; and the subsequent character is indicative of a non-word boundary when the subsequent character is a letter character.

10. The system of claim 1, wherein the data processing apparatus instructions cause the data processing apparatus to perform further operations comprising:

providing to a client device a search resource including interface instructions that cause the client device to generate a search interface that includes a query input field;

receive a query input from a client device, the query input having been input into the query input field and being one or more characters in a first input sequence constituting one or more words in a second input sequence;

in response to receiving data indicating a determination that the query input received from a client device does not meet a query suggestion threshold:

selecting a query input sequence from the query input, the query input sequence being up to a word n-gram of the most subsequent words of the one or more words in the second input sequence;

determining a likelihood that the query input sequence terminates at a word boundary from the word boundary count and non-word boundary count associated with a query sequence key matching the query input sequence; and providing search results responsive to the client device at the expiration of a providing time delay that is based on the determined likelihood.

11. The system of claim 10, wherein providing search results responsive to the client device at the expiration of the providing time delay comprises determining a length of the providing time delay in inverse proportion to the likelihood that the query input sequence terminates at a word boundary.

12. The system of claim 11, wherein the length of the providing time delay varies from 0 seconds to a maximum providing time delay.

13. The system of claim 12, wherein the length of the maximum providing time delay is 1 second.

14. The system of claim 10, wherein determining the likelihood that the query input sequence terminates at a word boundary from the word boundary count and non-word boundary count associated with the query sequence key matching the query input sequence comprises dividing the word boundary count by a sum of the word boundary count and non-word boundary count.

15. The system of claim 1, wherein the data processing apparatus instructions cause the data processing apparatus to perform further operations comprising:

providing to a client device a search resource including interface instructions that cause the client device to generate a search interface that includes a query input field;

receiving a query input from a client device, the query input having been input into the query input field and being one or more characters in a first input sequence constituting one or more words in a second input sequence;

in response to receiving a determination that the query input received from a client device does not meet a query suggestion threshold:

selecting a query input sequence from the query input, the query input sequence being up to a word n-gram of the most subsequent words of the one or more words in the second input sequence;

determining a likelihood that the query input sequence terminates at a word boundary from the word boundary count and non-word boundary count associated with a query sequence key matching the query input sequence; and providing search results responsive to the client device only if the determined likelihood meets a minimum likelihood threshold.

16. The system of claim 1, wherein the word n-gram is a word bi-gram.

17. The system of claim 15, wherein determining a likelihood that the query input sequence terminates at a word boundary from the word boundary count and non-word boundary count associated with a query sequence key matching the query input sequence comprises:

determining that a query input sequence that includes at least one word and at least a portion of another word subsequent to the at least one word in the second input sequence does not have a matching query sequence key; and in response to the determination:

using only the portion of the another word to search for a fallback query sequence key; and determining a likelihood that the query input sequence terminates at a word boundary from the word boundary count and non-word boundary count associated with the fallback query sequence key.

18. The system of claim 1, wherein associating in the data storage device the at least one word boundary count and non-word boundary counts with each query sequence key comprises:

determining whether the word boundary count for a query sequence key is zero and whether the non-word boundary count for a query sequence key is below a minimum non-word boundary count threshold; and associating in the data storage device the at least one word boundary count and non-word boundary counts the query sequence key only in response to determining at least one of:

the word boundary count for the query sequence key being greater than zero; or the word boundary count for the query sequence key being zero and the non-word boundary count for the query sequence being less than the minimum non-word boundary count threshold.

19. A system comprising:

a data processing apparatus; and a computer storage medium encoded with a computer program, the program comprising data processing apparatus instructions that when executed by the data processing apparatus cause the data processing apparatus to perform operations comprising:

accessing queries stored in query logs, each query being one or more characters in a first sequence constituting one or more words in a second sequence;

for each query:

selecting query sequences from the query, each query sequence being at least a portion of a word n-gram, the word n-gram being a subsequence of up to n words selected from the second sequence of words of the query, and for each query sequence:

determining one or more query sequence keys for the query sequence;

determining at least one of a word boundary count and a non-word boundary count for each query sequence key, each word-boundary count and non-word boundary count being dependent on the context of the query sequence;

for each query sequence key:

determining a likelihood that the query sequence for which the query sequence key is determined occurs a word boundary from the word boundary count and non-word boundary count associated with a query sequence key; and associating, in a data storage device, the likelihood with the query sequence key.

20. The system of claim 19, wherein determining the likelihood that the query sequence for which the query sequence key is determined occurs a word boundary from the word boundary count and non-word boundary count associated with a query sequence key comprises dividing the word boundary count by a sum of the word boundary count and non-word boundary count.

21. A method performed by a data processing apparatus, comprising:

accessing queries stored in query logs, each query being one or more characters in a first sequence constituting one or more words in a second sequence;

for each query:

selecting query sequences from the query, each query sequence being at least a portion of a word n-gram, the word n-gram being a subsequence of up to n words selected from the second sequence of words of the query, and for each selected query sequence:

determining one or more query sequence keys for the query sequence;

determining at least one of a word boundary count and a non-word boundary count for each query sequence key, each word-boundary count and non-word boundary count being dependent on the context of the query sequence; and associating, in a data storage device, the at least one word boundary count and non-word boundary counts with each query sequence key.

22. A system comprising:

a data processing apparatus; and a computer storage medium encoded with a computer program, the program comprising data processing apparatus instructions that when executed by the data processing apparatus cause the data processing apparatus to perform operations comprising:

providing to a client device a search resource including interface instructions that cause the client device to generate a search interface that includes a query input field;

receiving a query input from a client device, the query input having been input into the query input field and being one or more characters in a first input sequence constituting one or more words in a second input sequence;

in response to receiving data indicating a determination that the query input received from a client device does not meet a query suggestion threshold:

selecting a query input sequence from the query input, the query input sequence being up to a word n-gram of the most subsequent words of the one or more words in the second input sequence;

determining a likelihood that the query input sequence terminates at a word boundary from a word boundary count and a non-word boundary count associated with a query sequence key matching the query input sequence; and providing search results responsive to the client device at the expiration of a providing time delay that is based on the determined likelihood.

23. The system of claim 22, wherein the word boundary counts and non-word boundary counts are determined from an analysis of query logs storing queries, each query being one or more characters in a first sequence constituting one or more words in a second sequence.

24. The system of claim 22, wherein the word boundary counts and non-word boundary counts are determined from an analysis of a document corpus.

25. The system of claim 22, wherein receiving data indicating a determination that the query input received from a client device does not meet a query suggestion threshold comprises receiving data indicating that no query suggestions are determined for the query input.

26. A method performed by a data processing apparatus, comprising:

providing to a client device a search resource including interface instructions that cause the client device to generate a search interface that includes a query input field;

receiving a query input from a client device, the query input having been input into the query input field and being one or more characters in a first input sequence constituting one or more words in a second input sequence;

in response to receiving data indicating a determination that the query input received from a client device does not meet a query suggestion threshold:

selecting a query input sequence from the query input, the query input sequence being up to a word n-gram of the most subsequent words of the one or more words in the second input sequence;

determining a likelihood that the query input sequence terminates at a word boundary from a word boundary count and a non-word boundary count associated with a query sequence key matching the query input sequence; and providing search results responsive to the client device at the expiration of a providing time delay that is based on the determined likelihood.

* * * * *